United States Patent
Lim et al.

(10) Patent No.: US 10,101,812 B2
(45) Date of Patent: Oct. 16, 2018

(54) HAPTIC DEVICE AND DISPLAY HAVING THE SAME

(71) Applicant: Electronics and Telecommunications Research Institute, Daejeon (KR)

(72) Inventors: Jeong-Mook Lim, Daejeon (KR); Min-Kyu Kim, Daejeon (KR); Hee-Sook Shin, Daejeon (KR); Chang-Mok Oh, Daejeon (KR); Hyun-Tae Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 15/153,228

(22) Filed: May 12, 2016

(65) Prior Publication Data
US 2016/0357257 A1 Dec. 8, 2016

(30) Foreign Application Priority Data

Jun. 2, 2015 (KR) .................. 10-2015-0078019

(51) Int. Cl.
*G06F 3/01* (2006.01)
*G06F 3/041* (2006.01)

(52) U.S. Cl.
CPC .................. *G06F 3/016* (2013.01)

(58) Field of Classification Search
CPC combination set(s) only.
See application file for complete search history.

(56) References Cited

U.S. PATENT DOCUMENTS

| 8,797,295 | B2 | 8/2014 | Bernstein et al. | |
|---|---|---|---|---|
| 2009/0128508 | A1* | 5/2009 | Sohn | G06F 3/0421 345/173 |
| 2013/0314220 | A1* | 11/2013 | Colgate | G06F 3/016 340/407.1 |
| 2014/0015777 | A1 | 1/2014 | Park et al. | |
| 2014/0111480 | A1 | 4/2014 | Kim et al. | |
| 2014/0197936 | A1* | 7/2014 | Biggs | G08B 6/00 340/407.1 |

FOREIGN PATENT DOCUMENTS

| JP | 5352619 B2 | 11/2013 |
|---|---|---|
| KR | 10-2010-0074819 A | 7/2010 |
| KR | 10-2011-0110296 A | 10/2011 |
| KR | 10-2014-0008229 A | 1/2014 |
| KR | 10-2014-0050369 A | 4/2014 |
| KR | 10-2014-0053849 A | 5/2014 |
| KR | 10-2014-0083895 A | 7/2014 |

* cited by examiner

*Primary Examiner* — Jennifer Mehmood
*Assistant Examiner* — Deeprose Subedi
(74) *Attorney, Agent, or Firm* — Rabin & Berdo, P.C.

(57) ABSTRACT

A haptic device and a display having the same are disclosed. The haptic device in accordance with an embodiment of the present invention may include a first moving bar coupled to a first lateral surface of a touch sensor and a first actuator coupled to the first moving bar and configured to repeatedly move the first moving bar minutely in a direction of the first lateral surface.

18 Claims, 3 Drawing Sheets

HAPTIC DEVICE AND DISPLAY HAVING THE SAME

CROSS-REFERENCE TO RELATED APPLICATIONS

This application claims the benefit of Korean Patent Application No. 10-2015-0078019, filed with the Korean Intellectual Property Office on Jun. 2, 2015, the disclosure of which is incorporated herein by reference in its entirety.

BACKGROUND

1. Technical Field

The present invention relates to a haptic device and a display having the same.

2. Background Art

Mobile devices, which are currently in the markets in a variety of forms, including mobile phones, GPS navigators, DIDs (digital information displays) and tablet computers, are basically equipped with a touch interface. One of the methods standing out recently for augmenting user experience by linking with the touch interface is the haptic technology. When a user interacts with a digital object, the haptic technology links the user with the GUI to provide a more realistic user interface by providing a feedback with visual and tactile senses fused therein.

The most common conventional method for providing tactile senses is a motor method, which has been variously utilized in mobile devices, owing to the small size, fast reaction speed, low power and ease of tactile power control. However, when the tactile senses are provided using the motor method, it is difficult to dispose the tactile module due to its size, and the mobile device has to be inevitably thick. Particularly, since vibrations are delivered to the entire device when the conventional motor method is used, the tactile senses are felt by the hand holding the device, rather than by the touching hand, making it difficult to apply the motor method to non-handheld devices such as GPS navigators, DIDs and monitors.

Appeared to overcome this shortcoming is a film-type haptic module technology that can be installed over a display panel. The film-type haptic module mainly utilizes deformation of an electroactive polymer material or utilizes an electrostatic force. In the case of using an electroactive polymer material, it is possible to realize a film-type haptic module that consumes less electric power and has a fast reaction speed. However, since it is difficult to generate a sufficient force with the deformation of the polymer material only, an additional device (i.e., mass) having a certain weight is often used. In the end, the physical shape of the electroactive polymer material is deformed using electric energy, and the repeated deformation of the physical shape cause a periodic motion of the additional device. Then, the change in acceleration generated by the motion of the additional device delivers tactile senses to the user. Therefore, in this case, the electroactive polymer material and the additional device are required in order to generate a sufficient output.

A conventional method using the electrostatic force is disclosed in Korean Patent Application No. 2011-7018443, in which same or different electric charges are electrified, respectively, to 2 substrates, each having a conductive material coated thereon, while the 2 substrates are arranged to face opposite to each other, and tactile senses are generated by instantaneous attractive and repulsive forces caused by an electrostatic force generated between the 2 substrates. An actuator device constituted with these 2 substrates is configured independently above or below a touch panel. In an actual application, an insulating layer inserted between the substrates is additionally required to prevent electric conduction.

Another conventional method using electrostatic force uses electrostatic forces generated between a substrate having a conductive material coated thereon and a hand of the user. An advantage of this method is that there is no mechanical motion when the tactile senses are outputted. Nevertheless, since the electrostatic force generated between the substrate and the hand of the user is too small, the tactile senses are hardly delivered by simply having the hand of the user touch the substrate, except some frictional senses when the hand moves on the substrate.

The above-described conventional technologies are structured to have the entire device vibrated, to have the entire substrate, in which two sheets of electrodes are constituted as one actuator, vibrated, or to have tactile senses delivered when the hand of the user moves on the substrate, without mechanical vibrations. In the first case, the tactile senses are hardly provided unless it is a handheld device. In the second case, the device become thicker due to the space between the two sheets of electrodes, and the actuator itself may not be very durable due to foreign objects such as dust. In the third case, there are limited situations when the tactile senses can be provided. That is, the tactile senses may be delivered only when the hand is moving on the substrate.

The related art is described in U.S. Pat. No. 8,797,295.

SUMMARY

The present invention provides a haptic device and a display having the same that can deliver tactile senses on a surface of a display touched by a human hand even if the haptic device is not implemented in a handheld device.

An aspect of the present invention provides a haptic device that can reproduce tactile senses directly on a surface of a display touched by a hand of a user. The haptic device in accordance with an embodiment of the present invention may include: a first moving bar coupled to a first lateral surface of a touch sensor; and a first actuator coupled to the first moving bar and configured to repeatedly move the first moving bar minutely in a direction of the first lateral surface.

Here, the first actuator may include: a transducer configured to generate a displacement in the direction of the first lateral surface while an electric signal is applied and to return to an initial state when the electric signal is cut off; and a moving axis having one end thereof coupled to the first moving bar and the other end thereof coupled to the transducer and configured to push the first moving bar in the direction of the first lateral surface while the electric signal is applied and pull the first moving bar when the electric signal is cut off.

In an embodiment, the transducer may be made of a piezoelectric material being transformed to bulge in or out by the electric signal.

Here, the time taken for the transducer to return to the initial state may be shorter than the time taken for the transducer to reach the displacement.

Moreover, the electric signal may be repeatedly applied and cut off such that the first actuator repeatedly moves the first moving bar minutely.

In an embodiment, the haptic device may further include a second actuator placed to be spaced apart from the first actuator and configured to repeatedly move the first moving bar in the direction of the first lateral surface minutely.

In an embodiment, the haptic device may further include: a second moving bar coupled to a second lateral surface of the touch sensor; and a second actuator coupled to the second moving bar and configured to repeatedly move the second moving bar minutely in a direction of the second lateral surface.

Here, the first actuator and the second actuator may be disposed to face opposite to each other and may be displaced in opposite directions to each other by the electric signal.

In an embodiment, the haptic device may further include: a second moving bar spaced apart from the first moving bar and coupled to the first lateral surface of the touch panel; and a second actuator coupled to the second moving bar and configured to repeatedly move the second moving bar minutely in a direction of the second lateral surface.

Another aspect of the present invention provides a haptic display that includes: a housing having a top face with at least a portion hereof opened; a touch sensor disposed in the top face of the housing; a first moving bar coupled to a first lateral surface of the touch sensor; and a first actuator coupled to the first moving bar and configured to repeatedly move the first moving bar minutely in a direction of the first lateral surface.

In an embodiment, the touch sensor may include: an infrared light-emitting diode disposed on one side of an upper part of the touch sensor; and an infrared sensor disposed on the other side of the upper part of the touch sensor and configured to detect an infrared ray outputted by the infrared light-emitting diode.

In an embodiment, the haptic display may further include a flat panel display disposed underneath the touch sensor and supporting the touch sensor.

According to the present invention, there is provided a haptic device and a haptic display having the same that can not only sense a location touched by a user when the user interacts with an object outputted on a touch-type display using a finger or the like but also provide various, active kinds of haptic feedback.

The haptic device and the haptic display having the same in accordance with the present invention can reproduce tactile senses on a surface of the display where a hand of the user is touched, even if the apparatus installed with the haptic device and the haptic display is not a hand-held device. Moreover, the haptic device and the haptic display having the same in accordance with the present invention can be realized in the form of a single substrate, providing a practical thickness and a reliable durability from foreign substances such as dust and providing tactile senses even after the hand of the user is stopped.

Moreover, in the haptic device and the haptic display having the same in accordance with the present invention, the touch sensor vibrates in horizontal directions, and thus surface textures of different sizes may be provided using the same energy by vibrating the touch sensor in a direction that is the same as or opposite to a moving direction of the hand of the user.

BRIEF DESCRIPTION OF DRAWINGS

The present invention is described below with reference to embodiments illustrated in the accompanying drawings. To help understanding of the present invention, an identical reference numeral is assigned to identical elements. The configurations illustrated in the accompanying drawings are examples provided for illustrative purposes only and not for restricting the scope of the present invention.

DETAILED DESCRIPTION

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Figure 1A:
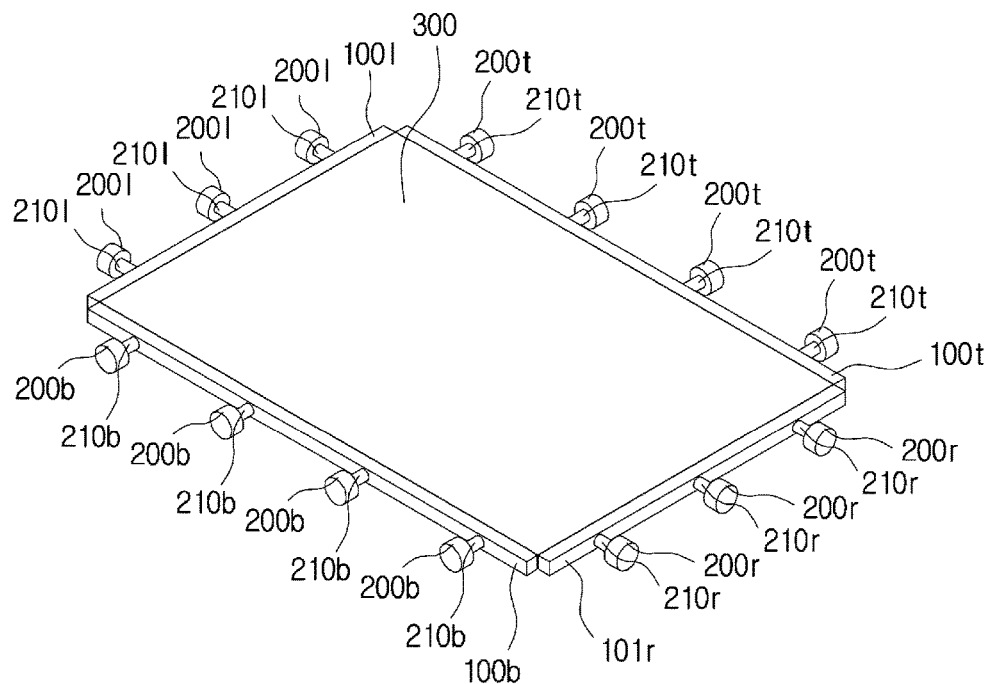
FIG. 1A illustrates an example of a haptic device.
Figure 1B:
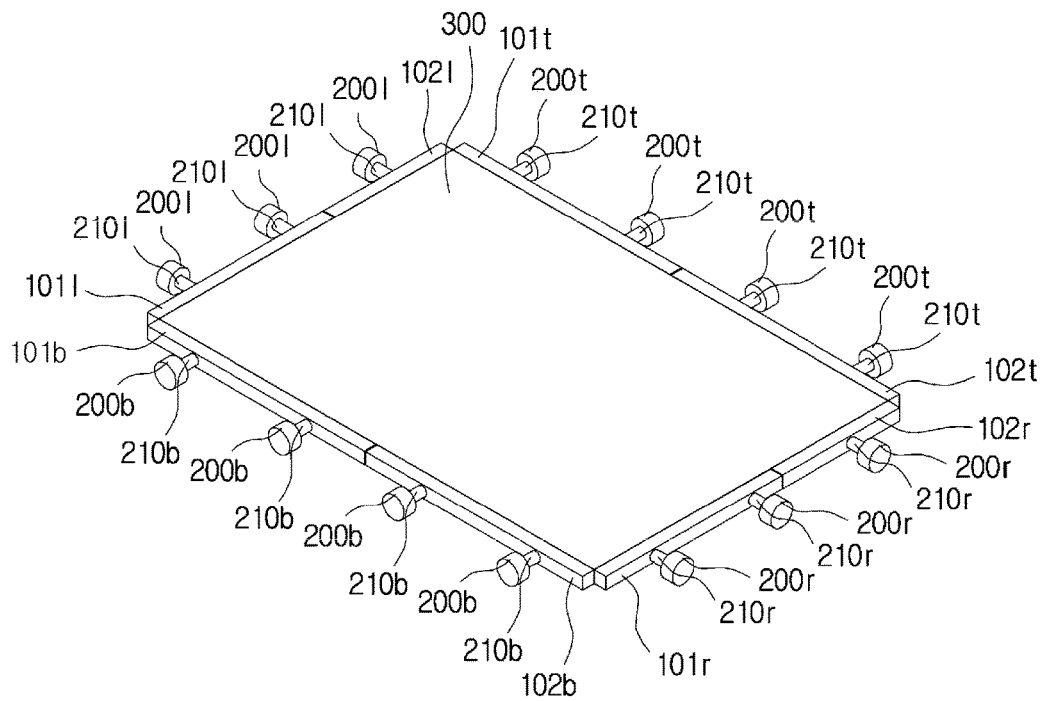
FIG. 1B illustrates another example of a haptic device.

FIG. 1A illustrates an example of a haptic device, and FIG. 1B illustrates another example of a haptic device.

A haptic device does not only sense a location touched by a user when the user interacts with an object outputted on a touch-type display using a finger or the like but also provide various, active kinds of haptic feedback. Referring to FIG. 1A, the haptic device includes moving bars and actuators. The actuators each include a transducer 200*l*, 200*r*, 200*b*, 200*t* and moving axis 210*l*, 210*r*, 210*b*, 210*t*.

The moving bars are each coupled to at least one lateral surface of a touch sensor 300. The haptic device illustrated in FIG. 1A includes 4 moving bars 100*l*, 100*r*, 100*b*, 100*t* coupled, respectively, to 4 lateral surfaces of the touch sensor 300. Here, the length of each of the moving bars 100*l*, 100*r*, 100*b*, 100*t* may be the same as or shorter than the length of the lateral surface of the touch sensor 300 to which each of the moving bars 100*l*, 100*r*, 100*b*, 100*t* is coupled. The moving bars 100*l*, 100*r*, 100*b*, 100*t* prevent the lateral surfaces of the touch sensor 300 from being damaged by a force exerted by the actuator and allow the force exerted by the actuator to be distributed evenly to the lateral surfaces of the touch sensor 300. Through this, the moving bars 100*l*, 100*r*, 100*b*, 100*t* may move the touch sensor 300 minutely in directions of the lateral surfaces thereof.

At least one actuator is coupled to each moving bar and is displaced in the direction of a lateral surface of the touch sensor 300. In the haptic device illustrated in FIG. 1A, 3 or 4 actuators are coupled to each moving bar. The actuators coupled to the moving bar repeatedly move the moving bars 100*l*, 100*r*, 100*b*, 100*t* minutely in directions of respective lateral surfaces thereof. The actuator may include transducers 200*l*, 200*r*, 200*b*, 200*t*, which are displaced according to electric signals, and moving axes 210*l*, 210*r*, 210*b*, 210*t*, which are coupled to the transducers 200*l*, 200*r*, 200*b*, 200*t*. Here, the transducers 200*l*, 200*r*, 200*b*, 200*t* may be, for example, but not limited to, piezoelectric devices, which are displaced to bulge in or out according to electric signals, or include any other devices that are capable of pushing or pulling the moving axes 210*l*, 210*r*, 210*b*, 210*t* in lateral directions. The displacements resulted by the transducers 200*l*, 200*r*, 200*b*, 200*t* provide forces for pushing or pulling the moving bars 100*l*, 100*r*, 100*b*, 100*t* in lateral directions. By the actuators pushing and pulling the touch sensor 300 in lateral directions, the touch sensor 300 is minutely moved in horizontal directions.

The touch sensor 300 is disposed above a flat panel display such as, for example, a liquid crystal display or an organic light emitting diode display, to sense the location touched by the user. The sensed location is converted to and outputted as coordinates. The touch sensor 300 may include various sensing methods, for example, the capacitance method, the resistive method and the infrared sensing method, and may refer to a flat-type touch sensor that is transparent and has a constant thickness. The touch sensor 300 may be integrally formed with the flat panel display. Hereinafter, unless required specifically to be distinguished, a detachable touch sensor and an integral-type touch sensor will be collectively referred to as the touch sensor 300.

Referring to FIG. 1B, the configuration of another example of the haptic device is illustrated.

Figure 2A:
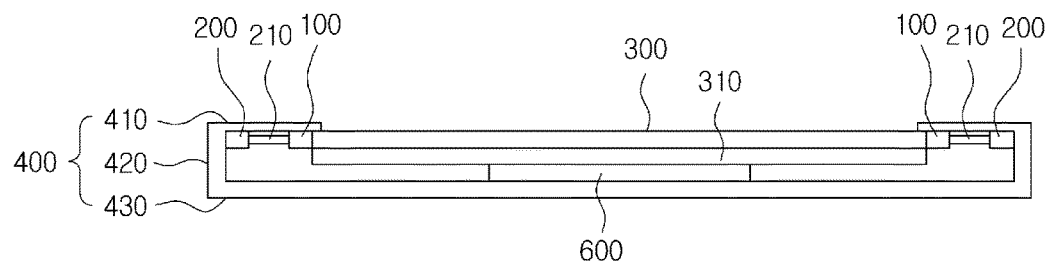
FIG. 2A illustrates an example of a haptic display having the haptic device illustrated in FIG. 1A or FIG. 1B.
Figure 2B:
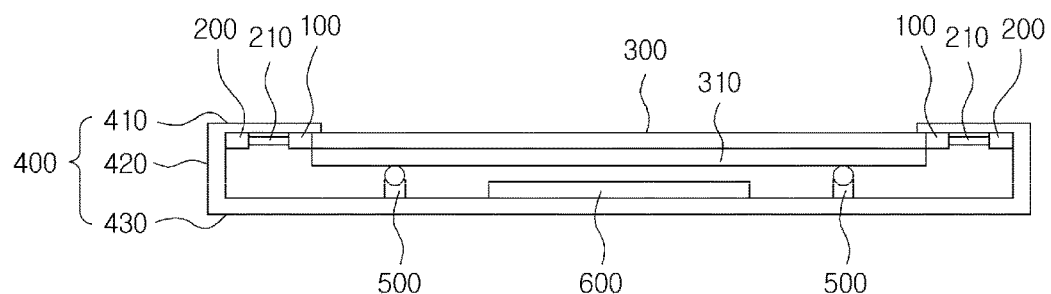
FIG. 2B illustrates another example of a haptic display having the haptic device illustrated in FIG. 1A or FIG. 1B.
Figure 2C:
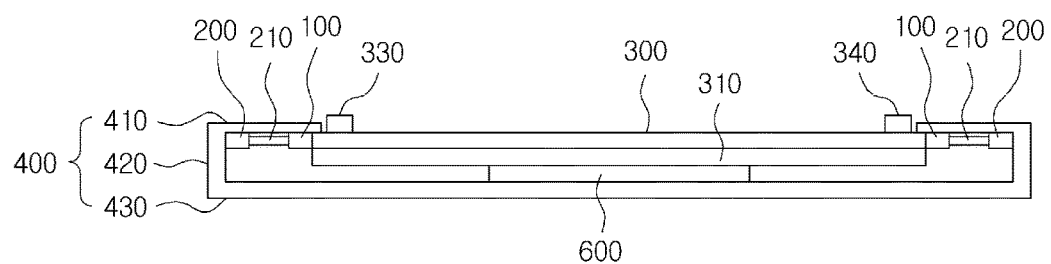
FIG. 2C illustrates yet another example of a haptic display having the haptic device illustrated in FIG. 1A or FIG. 1B.

In this example of the haptic device, a plurality of moving bars may be coupled to one lateral surface of the touch sensor 300. Each lateral surface of the touch sensor 300 of the haptic device illustrated in FIG. 1B has 2 moving bars of 8 moving bars 101*l*, 102*l*, 101*r*, 102*r*, 101*b*, 102*b*, 101*t*, 102*t* coupled thereto. The number of moving bars that can be coupled to one lateral surface of the touch sensor 300 may vary according to the length of the lateral surface and the length of the moving bars and may also vary according to a gap between the moving bars. By coupling a plurality of moving bars to each lateral surface of the touch sensor 300, it becomes possible to generate various patterns of vibrations. For example, if each lateral surface of the touch sensor 300 has a same number of actuators coupled thereto but has 2 moving bars coupled thereto, it is possible to change the moving distance of each moving bar such that the direction of vibrations of the touch sensor 300 varies. change FIG. 2A illustrates an example of a haptic display having the haptic device illustrated in FIG. 1A or FIG. 1B. FIG. 2B illustrates another example of a haptic display having the haptic device illustrated in FIG. 1A or FIG. 1B. FIG. 2C illustrates yet another example of a haptic display having the haptic device illustrated in FIG. 1A or FIG. 1B.

Referring to FIG. 2A, the haptic display has a function of displaying information to the user and a function of delivering a haptic feedback to the user. The function of displaying the information is realized by a flat panel display 310 and a display driving circuit 600, and the function of delivering the haptic feedback is realized by a touch sensor 300, moving bars 210 and actuators.

A housing 400 has installed therein elements for displaying information and elements for delivering haptic feedback. The housing 400 is constituted with a housing top face 410 having at least a portion thereof opened, a plurality of housing lateral faces 420 coupled to the housing top face 410, and a housing bottom face 430 coupled to the housing lateral faces 420. The opened portion of the housing top face 410 has the touch sensor 300 and the flat panel display 310 beneath the touch sensor 300 disposed therein to display information through the display 310 and provide haptic feedback through the touch sensor 300. The housing lateral faces 420 may have the actuators disposed on inner surfaces thereof, but it shall be appreciated that other various structures are possible so as to allow the touch sensor 300 to be displaced in lateral directions by the actuators.

The touch sensor 300 is disposed above the flat panel display 310 and may be moved in horizontal directions by the actuators. Here, the horizontal directions are lateral directions of the touch sensor 300. The touch sensor 300 is moved repeatedly in the horizontal directions minutely. Accordingly, the user may recognize that the touch sensor 300 is vibrating horizontally.

Moving bars 100 are coupled to lateral surfaces of the touch sensor 300 only. Therefore, even though the touch sensor 300 is repeatedly moved minutely in horizontal directions by the actuators, the position of the flat panel display 310 is not changed.

Referring to FIG. 2B, moving bars 110 are all coupled to lateral surfaces of the touch sensor 300 and lateral surfaces of the flat panel display 310. Although it is illustrated in FIG. 2B that the touch sensor 300 and the flat panel display 310 are distinguished from each other, it shall be understood that this example of haptic display also includes an integral-type touch sensor. In order to allow the touch sensor 300 and the flat panel display 310 to be repeatedly moved minutely by the moving bars 110, a support structure 500 may be disposed below the flat panel display 310. The bottom part of the support structure 500 is fixed to the housing bottom face 430, and the top part of the support structure 500 is in contact with a lower surface of the flat panel display 310. The top part of the support structure 500 may have a structure such as, for example, a ball bearing or a roller, which can not only support the flat panel display 310 sufficiently and sturdily but also minimize a friction between the top part of the support structure 500 and the lower surface of the flat panel display 310. The support structure 500 may be a plate-type spring.

Referring to FIG. 2C, it is illustrated that the touch sensor 300 senses a touch made by the user through an infrared sensing method. In the infrared sensing method, an infrared light-emitting diode 330, which outputs infrared rays, and an infrared sensor 340, which detects infrared rays, are disposed to face opposite to each other. FIG. 2C is illustrated, as an example, that a protective glass 320 for protecting the flat panel display 310 is disposed above the flat panel display 310, and the infrared light-emitting diode 330 and the infrared sensor 340 are disposed above the protective glass 320. However, it is also possible that the infrared light-emitting diode 330 and the infrared sensor 340 are disposed inside the housing 400.

Figure 3:
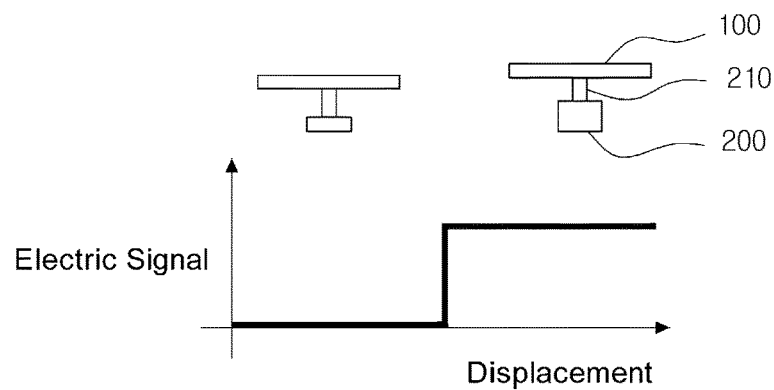
FIG. 3 illustrates an example of operation of actuators.

FIG. 3 illustrates an example of operation of an actuator.

Once an electric signal is applied, a transducer 200 is displaced. As illustrated in FIG. 3, when a predetermined strength of electric signal is applied, the transducer 200 begins to be displaced, and the amount of displacement is increased if the length of time at which the electric signal is applied is increased. A moving axis 210 is disposed between a moving bar 100 and the transducer 200 and functions to transfer the displacement of the transducer 200 to the moving bar 100.

The transducer 200 may be a disc-type of transducer that operates in the bimorph principle of bulging in and/or out according to an electric signal. Here, a frequency of the electric signal may belong to an ultrasonic band. The transducer 200 may be made of a piezoelectric material (e.g., piezoelectric ceramic, piezoelectric polymer, etc.), which reacts very quickly with, and is displaced by, a supply and cut-off of an electric signal, that is, a potential difference.

The actuator includes the transducer 200, which is displaced by an electric signal, and a moving axis 210, which transfers the displacement to the moving bar 100 and moves the moving bar 100 minutely. The moving axis 210 moves minutely in a direction of moving axis, that is, in a lateral direction of the touch sensor 300, according to the extent of displacement. Here, the moving bar 100, which surrounds the moving axis 210, moves along with the moving axis 210 when the moving speed of the moving axis 210 is slow, but a slip is occurred between the moving axis 210 and the moving bar 100 when the moving speed of the moving axis 210 is very and thus the moving axis 210 moves very momentarily. Using this principle, it becomes possible for the actuator, in which the moving axis 210 is fixed to the transducer 200, to change the position of the moving bar 100 minutely according to the momentary motion of the transducer 200. This amount of displacement is normally smaller than a few micrometers and thus cannot be visible to the naked eye. The transducer 200 can be displaced very quickly by the supplied electric signal in a frequency belonging to the ultrasonic frequency band. That is, it is possible for the transducer 200 to repeatedly move the moving bar 100 using a frequency that is substantially the same as or lower than an ultrasonic frequency.

That is, based on the orientation shown in FIG. 3, if the transducer 200 is slowly bulged out and the moving axis 210 moves upwardly to push the moving bar 100, the moving bar 100 is moved upwardly. Then, if an electric signal is applied to have the transducer 200 bulged in quickly, the slip is occurred between the moving bar 100 and the moving axis 210, and the moving bar 100 stays at a position to which the moving bar 100 has moved upwardly. By repeating these operations in a high frequency, it is possible to control the moving bar 100 to reach a desired position.

The actuator utilizing this principle is very small, creates little noise and consumes a very small amount of power. Therefore, using several of these actuators at the same time, various shapes of deformations may be created to render a shape or generate haptic stimulations.

Figure 4:
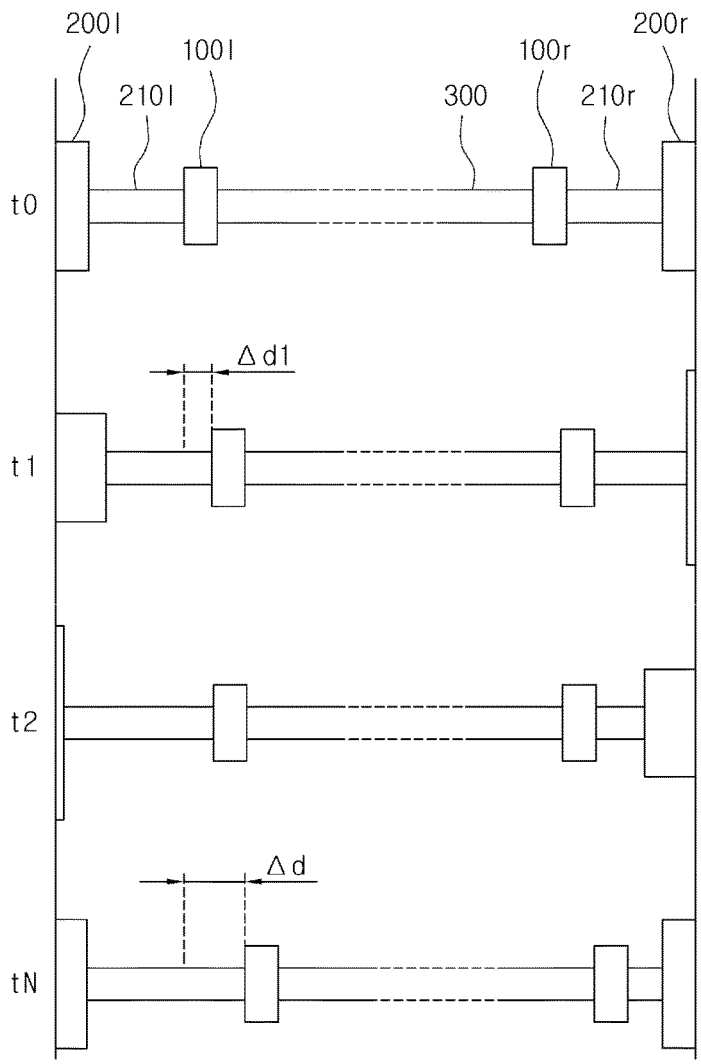
FIG. 4 illustrates certain examples of vibrations generated by actuators.

FIG. 4 illustrates certain examples of vibrations generated by actuators.

While it is illustrated in FIG. 4 that the actuators are coupled to either lateral surface of the touch sensor 300, it is possible that the actuator is only coupled to any one lateral surface of the touch sensor 300. In such a case, the other lateral surface of the touch sensor 300 may have, for example, a spring coupled thereto. Moreover, although it is illustrated and described that the actuators coupled to either lateral surface of the touch sensor 300 are displaced in opposite directions to each other, it is also possible that one of the actuators coupled to one lateral surface is only displaced and the other actuator coupled to the other lateral surface is not displaced.

Transducers 200*l*, 200*r* are in an initial state at time t0. In the initial state, no electric signal is applied, and thus the transducers 200*l*, 200*r* are not displaced.

When electric signals are applied at time t1, by applying electric signals having opposite phases to the transducer 200*l* on one side and the transducer 200*r* on the other side, respectively, the transducers 200*l*, 200*r* are displaced in opposite directions. In other words, when the transducer 200*l* is displaced to bulge out, the transducer 200*r* is displaced to bulge in, making moving axes 210*l*, 210*r* on either side move in a same direction (i.e., to the right side). Since the moving axes 210*l*, 210*r* on either side move in the same direction, moving bars 100*l*, 100*r* on either side move the touch sensor 300 to the right side by a moving distance Δd1 from the initial state.

When electric signals are applied at time t2, by applying electric signals having opposite phases to the transducer 200*l* on the one side and the transducer 200*r* on the other side, respectively, the displacement of the transducers 200*l*, 200*r* may be occurred in an opposite way from t1. That is, the transducer 200*l* may be displaced to bulge in, and the transducer 200*r* may be displaced to bulge out, making the moving axes 210*l*, 210*r* on either side move in a same direction (i.e., to the left side). Here, by making the displacement time of the transducers 200*l*, 200*r* on either side faster than t1, a slip is occurred between the moving axes 210*l*, 210*r* and the moving bars 100*l*, 100*r*, and thus the positions of the moving bars 100*l*, 100*r* are not changed, and only the moving axes 210*l*, 210*r* are repositioned in the left direction.

By repeatedly performing motions at times t1 and t2, the moving bars 100*l*, 100*r* on either side move the touch sensor 300 minutely to the right side by a desired distance Δd from the initial state.

Moreover, by controlling the transducers 200*l*, 200*r* in an opposite way from the motions at time t1 and t2, the touch sensor 300 may be minutely moved to the left side by Δd. That is, by rapidly moving the touch sensor 300 by Δd to the left and right sides, the haptic senses are generated.

Figure 5:
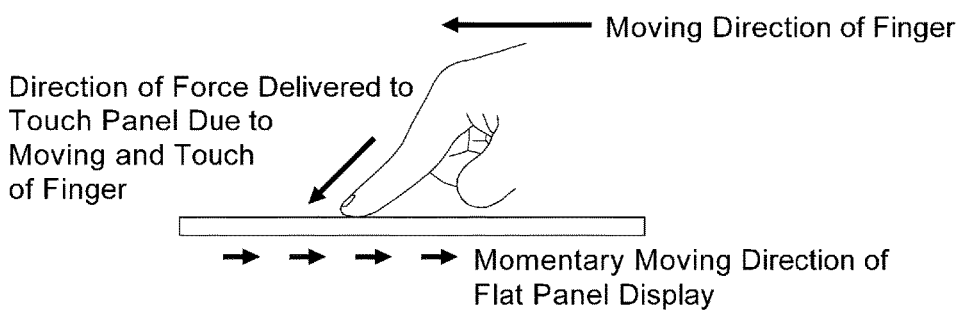
FIG. 5 illustrates an example of generating a haptic effect.

FIG. 5 illustrates an example of generating a haptic effect.

Referring to FIG. 5, the haptic effect may be generated based on a moving direction of a finger of the user. Once the finger of the user touches the touch sensor, a change in touched position caused by the moving of the finger may be detected. The moving direction of the finger may be determined based on the change in touched position. A direction of minute, repeated moving of the touch sensor is determined based on the determined moving direction of the finger. When the finger of the user touches the touch sensor, a force is exerted to the touch sensor by the finger. When a predetermined force is exerted to the touch sensor, repeated, minute movements of the touch sensor are felt as a sense of vibrations by the user. Here, if the touch sensor is repeatedly moved in an opposite direction to the moving direction of the finger, the user may feel a greater sense of resistance than when the finger is stopped. That is, if a user touch has a motion with a predetermined direction, a greater haptic sense, such as the sense of resistance, may be provided to the user by the touch sensor that is moving in the opposite direction to the direction of touch, or a haptic sense of slipping may be provided by the touch sensor that is moving in the same direction as the direction of touch.

Meanwhile, the direction of minute, repeated moving of the touch sensor may be combined based on the moving direction of the finger. If the finger moves in a diagonal direction or clockwise/counterclockwise direction, the touch sensor may be controlled to move minutely in different directions alternately. For example, the actuators may be controlled in such a way that the moving bars 100*l*, 100*r* shown in FIG. 1A move n times minutely to the left and right and then the moving bars 100*t*, 100*b* move m times minutely up and down. As such, by controlling the moving bars to move in different directions and different numbers, it is possible to allow the user to feel the texture of an object displayed on the flat panel display through vibrations.

Hitherto, certain embodiments of the present invention have been described, and it shall be appreciated that a large number of permutations and modifications of the present invention are possible without departing from the intrinsic features of the present invention by those who are ordinarily skilled in the art to which the present invention pertains. Accordingly, the disclosed embodiments of the present invention shall be appreciated in illustrative perspectives, rather than in restrictive perspectives, and the scope of the technical ideas of the present invention shall not be restricted by the disclosed embodiments. The scope of protection of the present invention shall be interpreted through the claims appended below, and any and all equivalent technical ideas shall be interpreted to be included in the claims of the present invention.

What is claimed is:

1. A haptic device comprising:
   a first moving bar directly coupled to a first lateral edge surface of a touch sensor; and
   a first actuator directly coupled to the first moving bar and configured to repeatedly move the first moving bar minutely in a direction of the first lateral surface;
   wherein the first actuator includes
   a transducer configured to generate a displacement in the direction of the first lateral edge surface while an electric signal is applied and to return to an initial state when the electric signal is cut off; and
   a moving axis having one end thereof directly coupled to the first moving bar and the other end thereof directly coupled to the transducer and configured to push the first moving bar in the direction of the first lateral edge surface while the electric signal is applied and pull the first moving bar when the electric signal is cut off.

2. The haptic device of claim 1, wherein the transducer is made of a piezoelectric material being transformed to bulge in or out by the electric signal.

3. The haptic device of claim 1, wherein time taken for the transducer to return to the initial state is shorter than time taken for the transducer to reach the displacement.

4. The haptic device of claim 1, wherein the electric signal is repeatedly applied and cut off such that the first actuator repeatedly moves the first moving bar minutely.

5. The haptic device of claim 1, further comprising a second actuator placed to be spaced apart from the first actuator and configured to repeatedly move the first moving bar in the direction of the first lateral surface minutely.

6. The haptic device of claim 1, further comprising:
   a second moving bar coupled to a second lateral surface of the touch sensor; and
   a second actuator coupled to the second moving bar and configured to repeatedly move the second moving bar minutely in a direction of the second lateral surface.

7. The haptic device of claim 6, wherein the first actuator and the second actuator are disposed to face opposite to each other and are displaced in opposite directions to each other by the electric signal.

8. The haptic device of claim 1, further comprising:
   a second moving bar spaced apart from the first moving bar and coupled to the first lateral surface of the touch panel; and
   a second actuator coupled to the second moving bar and configured to repeatedly move the second moving bar minutely in a direction of the second lateral surface.

9. A haptic display comprising:
   a housing having a top face with at least a portion hereof opened;
   a touch sensor disposed in the top face of the housing;
   a first moving bar directly coupled to a first lateral edge surface of the touch sensor; and
   a first actuator directly coupled to the first moving bar and configured to repeatedly move the first moving bar minutely in a direction of the first lateral surface;
   wherein the first actuator includes
   a transducer configured to generate a displacement in the direction of the first lateral edge surface while an electric signal is applied and to return to an initial state when the electric signal is cut off; and
   a moving axis having one end thereof directly coupled to the first moving bar and the other end thereof directly coupled to the transducer and configured to push the first moving bar in the direction of the first lateral edge surface while the electric signal is applied and pull the first moving bar when the electric signal is cut off.

10. The haptic display of claim 9, wherein the transducer is made of a piezoelectric material being transformed to bulge in or out by the electric signal.

11. The haptic display of claim 9, wherein time taken for the transducer to return to the initial state is shorter than time taken for the transducer to reach the displacement.

12. The haptic display of claim 9, wherein the electric signal is repeatedly applied and cut off such that the first actuator repeatedly moves the first moving bar minutely.

13. The haptic display of claim 9, further comprising a second actuator placed to be spaced apart from the first actuator and configured to repeatedly move the first moving bar in the direction of the first lateral surface minutely.

14. The haptic display of claim 9, further comprising:
    a second moving bar coupled to a second lateral surface of the touch sensor; and
    a second actuator coupled to the second moving bar and configured to repeatedly move the second moving bar minutely in a direction of the second lateral surface.

15. The haptic display of claim 14, wherein the first actuator and the second actuator are disposed to face opposite to each other and are displaced in opposite directions to each other by the electric signal.

16. The haptic display of claim 9, further comprising:
    a second moving bar spaced apart from the first moving bar and coupled to the first lateral surface of the touch panel; and
    a second actuator coupled to the second moving bar and configured to repeatedly move the second moving bar minutely in a direction of the second lateral surface.

17. The haptic display of claim 9, wherein the touch sensor comprises:
    an infrared light-emitting diode disposed on one side of an upper part of the touch sensor; and
    an infrared sensor disposed on the other side of the upper part of the touch sensor and configured to detect an infrared ray outputted by the infrared light-emitting diode.

18. The haptic display of claim 9, further comprising a flat panel display disposed underneath the touch sensor and supporting the touch sensor.

* * * * *